Feb. 23, 1937.  I. W. KNIGHT  2,071,749
VALVE
Filed Feb. 20, 1936
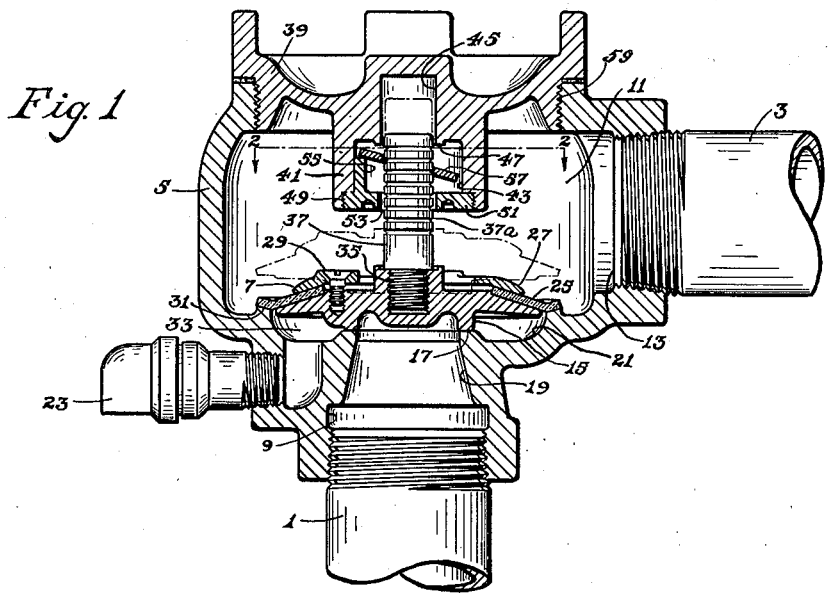
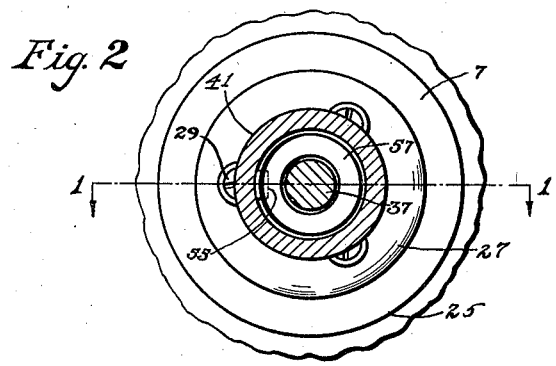
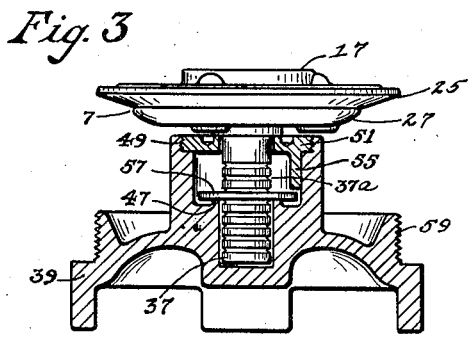
IRA W. KNIGHT
INVENTOR.
BY Harry Dexter Peck
ATTORNEY.

Patented Feb. 23, 1937

2,071,749

UNITED STATES PATENT OFFICE 2,071,749

VALVE

Ira W. Knight, Providence, R. I., assignor to General Fire Extinguisher Company, Providence, R. I., a corporation of Delaware Application February 20, 1936, Serial No. 64,849

3 Claims. (Cl. 137—153)

This invention relates to improvements in valves. More especially it has to do with a valve which holds back the water supply in a fire extinguishing system from pipes containing air under pressure.

The valve is particularly applicable in an ordinary automatic wet pipe system where certain portions thereof may at times be exposed to freezing temperatures, as for example where sprinklers are installed over an out-of-door shipping platform or near the glass exposure of a roof. The cost of installing and maintaining a usual type of dry pipe system for such exposures is rather high and so extensions of the wet pipe system are used when temperatures permit and then during the winter months these extensions are shut off and drained of their water contents. In case of fire occurring in these thus unprotected regions the cut-off valves are opened by hand or by some form of actuating devices auxiliary to the sprinkler system itself.

Instead of depending upon response by a human individual, or upon the more or less delicate auxiliary apparatus, it is an object of the invention to provide a simple and rather inexpensive valve which can be installed in a wet pipe system in place of an ordinary right-angled elbow fitting. It is also an object to provide an efficient differential valve which will be simple to manufacture and install, and which can easily be inspected and reset should occasion require.

Another important object of the invention is to provide against a reclosing of the valve after it has been actuated to open. This object is attained by providing a simple latch washer which coacts with a stem on the valve in such manner as to latch the valve against return movement toward its seat at any position to which the valve may be moved from its seat.

In the illustrated embodiment of the invention, the valve shown is of the differential type with its closure element seating across the inlet opening from the wet pipe and with its valve chamber in open communication through a side outlet with the air filled pipes of the system.

The water pressure acts directly on the closure tending to open it and the air pressure also acts directly on the opposite side of the closure to maintain it seated. By virtue of the relative effective areas of the closure exposed to the water and air pressures, the usual differential of approximately a 6 to 1 ratio is provided. Upon the air pressure falling due to the opening of one or more sprinkler heads, the closure is lifted from its seat and thereupon the latching device assumes control against any return of the closure toward its seat. This prevents any water columning of the valve—a condition which has been found to occur where water passes the closure into the normally air-filled pipes and is therein retained by reseating of the valve. The latch of this invention prevents any such reseating and so, once the closure has opened for flow of water past it into the distributing pipes, this opening will remain until the valve is manually reset.

The best mode in which I have contemplated applying the principles of my invention is shown in the accompanying drawing but this is merely illustrative and it is intended that the patent shall cover by suitable expression in the appended claims whatever features of patentable novelty exist in the invention disclosed.

In the accompanying drawing:

Figure 1 is an elevation in section, as on line 1—1 of Figure 2, showing the center valve closed in full lines, and partly open in dotted outline;

Figure 2 is a plan in section, taken as on line 2—2 of Figure 1; and

Figure 3 is an elevation of the center valve and cover, with the latter in section and with both in inverted position.

Referring more particularly to the drawing, the pipe 1 represents a wet pipe sprinkler system or other source of supply in which water under pressure stands ready for sprinkler discharge. The pipe 3 represents dry distributing pipes extending to sprinklers (not shown) in locations exposed to freezing temperatures or where for other reasons it may be desired to have no water in the pipes until the need of sprinkler discharge arises. Between the pipe 1 and the pipe 3 is a valve 5 having a closure element 7 seating across the inlet 9. The valve chamber 11 and pipe 3 are in open connection with one another through the outlet 13, and normally contain air at a pressure dependent upon the water pressure acting on the under side of the closure 7.

This closure, or center valve as it is also called, has a depending ring 15 with a nicely finished face constructed and arranged to make a tight metal-to-metal contact with a similarly finished seat 17 at the upper end of the valve inlet. The latter has a rather sharply tapered approach 19 which offers no appreciable resistance to flow of water and makes possible a relatively small valve structure because the area of the seat opening is consequently small.

Immediately surrounding the seat 17 is an annular recess 21 over which the plate-like body portion of the closure 7 extends and carried at its edge a rubber or diaphragm ring 25. This rubber ring is clamped to the upper surface of the center valve body by a metal clamping ring 27 secured to the body by screws 29. The outer edge of the diaphragm ring overlies and makes contact with an annular ring seat 31 whose surface is preferably inclined toward the axis of the valve. With the closure thus seated with metal-to-metal contact between the ring 15 and the seat 17, and with rubber-to-metal contact between the ring 25 and seat 31, the space 33 between the closure and the casing becomes an intermediate chamber normally open to atmosphere through a ball drip 23 which is capable of being closed by an appreciable flow of water. The ratio between the effective area on one side of the closure exposed to the air pressure and the effective area on its opposite side exposed to the water pressure, determines the ratio or differential of the valve.

A threaded socket 35 at the center of the upper side of the closure receives a cylindrical stem 37. This extends upward into a cover plug 39 which screws into the top of the valve casing. This cover is cast with a depending hub 41 of appreciable extent. The latter is machined to provide a portion or chamber 43 at its lower end considerably greater in diameter than the stem 37 and a smaller chamber or socket 45 at its upper end. Both chambers are in axial alignment with the axis of the center valve. At the entrance to the upper or smaller chamber a depending seat or shoulder 47 is provided. The lower end of the hub 41 is interiorly threaded as at 49 to receive a collar or sleeve disk 51. The latter, for the most part, is a plain annular ring having a central opening 53 through which the stem 37 loosely projects. At one point on the upper side of this disk is an upstanding lug or post 55. This may be made integral with the disk as shown or may be provided by a pin secured to the disk.

Within the chamber 43 is a latch washer 57 which has an outer diameter somewhat smaller than that of the cylindrical chamber 43 and has a center hole of slightly greater diameter than that of the stem. When the valve is closed, as seen in Figure 1, this washer lies in an inclined position, as shown, with its edge resting on the upper end of the post 55. As the valve is lifted from its seat, the stem 37 moves upward through the fixed disk 51 and also through the inclined washer 57. If the opening movement is a comparatively rapid one, sufficient to move the valve to wide-open position, the fluid in the upper chamber 45 of the cover acts with cushioning effect and prevents undesirable slamming of the center valve against the cover.

Regardless of whether the valve moves to its wide-open position, or only to a partly open position as seen in dotted outline in Figure 1, the stem slides freely through the washer so long as the direction of movement is upward. But if the valve attempts to return to its seat, the latch washer binds tightly on the stem and prevents any such movement. This binding is effected by virtue of the inclination of the washer with respect to the stem. The holding effect may be enhanced by providing a series of grooves 37a along the surface of the stem.

If the center valve is held in a partly opened position, each as is indicated in dotted outline in Figure 1, there is no resistance offered by the washer to further opening movement of the valve, because any upward motion of the stem simply lifts the washer which then tilts sufficiently to permit the stem to pass upward through it. But any tendency for the valve to descend causes the stem to be gripped with holding effect by the washer.

After the center valve has thus opened, either partially or completely, the cover 39 must be removed before the valve can be reset. The cover is simply unscrewed from the casing and inverted, as seen in Figure 3. Upon being thus inverted the latch washer drops onto the seat or shoulder 47 and the stem can then be easily withdrawn from the cover, thus separating the center valve therefrom. Upon the cover being again turned to its normal upright position, the washer 57 will fall away from the shoulder 47. The space provided around this shoulder between the outer portion of the washer and the casing avoids any suction-like action on the washer.

While the cover and center valve are removed the valve seats 17 and 31 may be cleaned. The valve is then placed on these seats and the cover applied by passing the disk 51 down around the stem 37 until the threads 59 on the cover engage the corresponding threads on the casing. The cover is then screwed into place with the washer, still in its tilted position, moving downward around the stem. When tightly in place the valve is closed and the system can then be reset by first applying the air pressure to the upper side of the center valve and finally admitting the water pressure to its underside.

The valve requires no further attention or maintenance until after it has been opened, following which, because of the certainty of the latch action, the cover and valve must again be removed before it can once more be closed.

I claim:

1. A valve for a dry pipe system having, in combination, a casing having a top opening and an inlet and an outlet with a waterway between; a closure adapted when seated to close said inlet and when opening to move in said waterway vertically upward from its seat; a stem extending upward from the top side of said closure; an imperforate cover for said top opening comprising a hub projecting into said waterway, and having a chamber into which said stem projects; a latch washer in said chamber around said stem; and means whereby said washer is held in an inclined position with respect to the direction of movement of said stem; the said stem, washer and holding means coacting to latch the closure against return to its seat in any position to which it may be moved away from its seat; the said cover, latch and closure being removable as a unit through said top opening to permit them to be turned upside down to release said latch.

2. A valve having, in combination, a casing having top opening and in alignment therewith having a horizontally disposed seat; a closure resting on said seat and arranged to move vertically upward in opening; a stem upstanding on said closure; and means constructed and arranged above said closure comprising an imperforate chambered cover for said top opening and containing in its chamber a latch element past which the said stem may move freely in an upward direction; the said element being normally inclined to the direction of movement of said stem and capable upon any tendency of downward movement on the part of said stem to engage said stem on opposite sides thereof and hold the stem and closure against movement toward the said seat; the arrangement of said cover, element and closure being such that they must be removed as a unit through the top opening and inverted to release the closure from the element.

3. A valve having, in combination, a casing having a top opening and in alignment therewith having a horizontally disposed seat; a closure resting on said seat and arranged to move vertically upward on opening; a stem upstanding on said closure; an imperforate cover for said top opening having above said closure but within said casing a chamber into which said stem extends; a latching element within said chamber normally positioned at an inclination to the axis of said stem; said element being constructed and arranged to move upwardly upon upward movement of said stem whereby said stem may pass by it freely, and to engage said stem on opposite sides thereof upon any tendency of said stem to move downward whereby said stem and closure are held against movement toward the said seat; the said cover, element, and closure being removable as a unit through the said top opening to permit release of the closure from the latching element.

IRA W. KNIGHT.